UNITED STATES PATENT OFFICE.

ERNEST WM. COOKE, OF CHICAGO, ILLINOIS.

LUBRICANT.

SPECIFICATION forming part of Letters Patent No. 454,588, dated June 23, 1891.

Application filed December 5, 1889. Serial No. 332,735. (Specimens.)

*To all whom it may concern:*

Be it known that I, ERNEST WILLIAM COOKE, a citizen of the United States, residing at Chicago, in the county of Cook and State of Illinois, have invented a new Lubricant, of which the following is a specification.

My invention has relation to an improved lubricant; and my object is to provide a composition which will lessen friction and at the same time prevent "shelling" and harden the surfaces of metal with which it is brought in contact.

With these objects in view my lubricant consists of the following ingredients, combined in the proportions stated, to wit: tallow, five hundred and fifty parts; powdered mica, fifty parts; graphite, two hundred parts; ferro-cyanide of potassium, fifty parts; dextrine, fifty parts; paraffine, two hundred parts; litharge, two hundred parts; chloride of ammonium, fifty parts; glycerine, two hundred and forty parts.

In preparing my lubricant I first melt the paraffine and tallow together and while hot pour in the litharge, stirring the mass thoroughly. I next add glycerine, and after stirring permit the mixture to settle, still keeping the entire mass hot. The other ingredients I then add to the liquid mixture in any suitable manner, the cyanide of potassium serving to harden the surface of all metal with which it may come in contact, thus preventing shelling, which is so common and injurious to bearing-surfaces. After all the ingredients are mixed together thoroughly the composition is then allowed to cool, and is ready for use and may be applied in any suitable or convenient manner.

Having fully described my lubricant, what I claim, and desire to secure by Letters Patent, is—

The herein-described composition of matter to be used as a lubricant, consisting of tallow, powdered mica, graphite, ferro-cyanide of potassium, dextrine, paraffine, litharge, chloride of ammonium, and glycerine, combined in the proportions specified.

ERNEST WM. COOKE.

In presence of—
   T. MCALLISTER,
   T. E. SHEEHE.